(12) United States Patent
Shiau et al.

(10) Patent No.: US 8,339,243 B2
(45) Date of Patent: Dec. 25, 2012

(54) SYSTEM AND METHOD FOR POSITIONING ACTIVE RFID TAG

(75) Inventors: Jun-Ting Shiau, Hsinchu (TW);
Jen-Hao Hsu, Hsinchu (TW);
Chia-Chin Yu, Hsinchu (TW)

(73) Assignee: Mitac Technology Corp., Hsinchu (TW)

(*) Notice: Subject to any disclaimer, the term of this patent is extended or adjusted under 35 U.S.C. 154(b) by 814 days.

(21) Appl. No.: 12/347,833

(22) Filed: Dec. 31, 2008

(65) Prior Publication Data
US 2010/0164723 A1 Jul. 1, 2010

(51) Int. Cl.
*H04Q 5/22* (2006.01)
*G08B 1/08* (2006.01)
*G01S 1/00* (2006.01)
*G01S 1/08* (2006.01)

(52) U.S. Cl. ............ 340/10.1; 340/10.3; 340/10.4; 340/539.21; 342/385; 342/386

(58) Field of Classification Search ............ 340/10.1, 340/10.2, 10.4, 10, 572.1, 572
See application file for complete search history.

(56) References Cited

U.S. PATENT DOCUMENTS

| | | | | |
|---|---|---|---|---|
| 5,513,246 A * | 4/1996 | Jonsson et al. | | 455/443 |
| 6,018,317 A * | 1/2000 | Dogan et al. | | 342/378 |
| 6,024,655 A * | 2/2000 | Coffee | | 473/407 |
| 6,298,306 B1 * | 10/2001 | Suarez et al. | | 701/484 |
| 6,812,824 B1 * | 11/2004 | Goldinger et al. | | 340/10.1 |
| 7,242,306 B2 * | 7/2007 | Wildman et al. | | 340/573.1 |
| 7,411,921 B2 * | 8/2008 | Strong et al. | | 370/328 |
| 7,432,855 B2 * | 10/2008 | Mohamadi | | 342/368 |
| 7,689,240 B2 * | 3/2010 | Anderson | | 455/522 |
| 2003/0054813 A1 * | 3/2003 | Riley et al. | | 455/424 |
| 2005/0237953 A1 * | 10/2005 | Carrender et al. | | 370/278 |
| 2005/0243936 A1 * | 11/2005 | Agrawala et al. | | 375/259 |
| 2005/0285790 A1 * | 12/2005 | Gagnon | | 342/457 |
| 2006/0244588 A1 * | 11/2006 | Hannah et al. | | 340/539.13 |
| 2010/0194641 A1 * | 8/2010 | Miller | | 342/417 |
| 2011/0221634 A1 * | 9/2011 | Libby et al. | | 342/451 |

\* cited by examiner

*Primary Examiner* — Daniel Wu
*Assistant Examiner* — Emily C Terrell
(74) *Attorney, Agent, or Firm* — Apex Juris, pllc; Tracy M. Heims

(57) ABSTRACT

A positioning system and method are provided to use multiple RFID readers to position a target object with an active RFID tag equipped thereon. The system and method defines a geometric center of the locations of the RFID readers as a first coordinate. When the RFID readers continuously receive RF signals of the active RFID tag, a corresponding signal intensity of each of the RF signals is calculated and compared to obtain an approaching vector corresponding to the location of the RFID reader with the greatest signal intensity of the RF signal. A positioned location of the target object is then approached from the first coordinate to a second coordinate according to the approaching vector. The first coordinate and the positioned location of the target object will be reset as the second coordinate. The reset first coordinate is output as the latest positioned location of the target object.

20 Claims, 9 Drawing Sheets

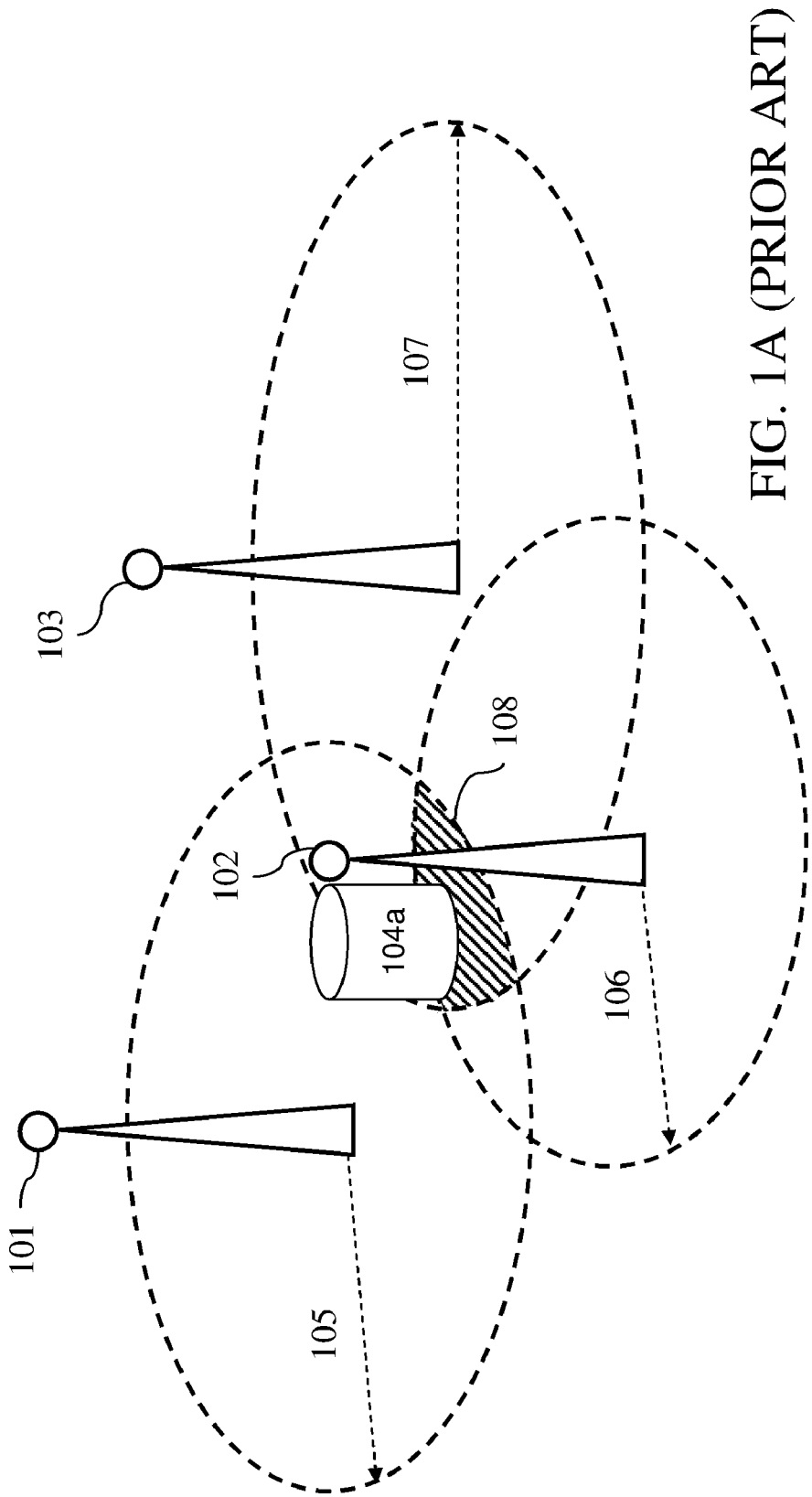

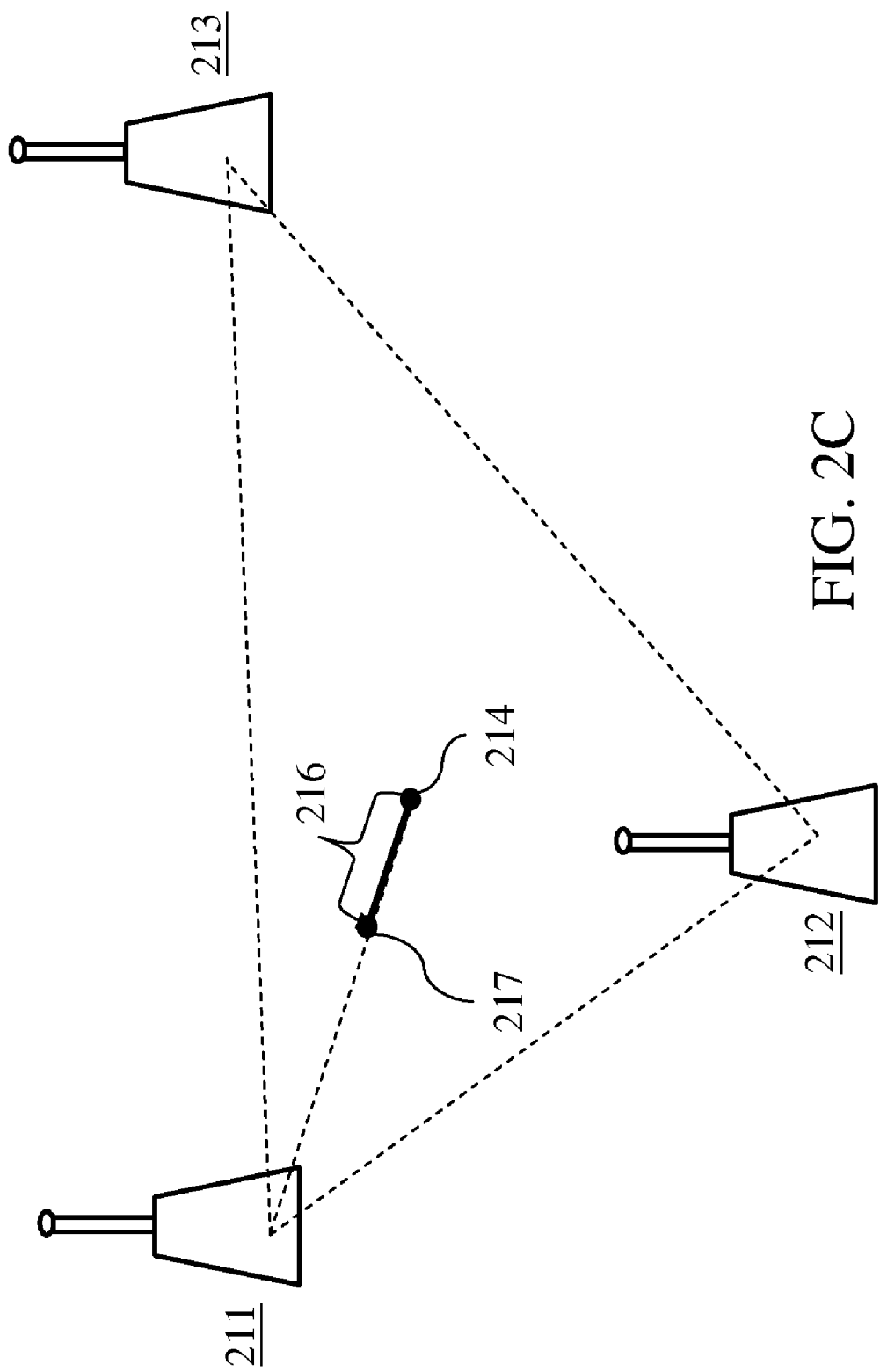

SYSTEM AND METHOD FOR POSITIONING ACTIVE RFID TAG

BACKGROUND OF THE INVENTION

1. Field of the Invention

The present invention relates to RFID (Radio Frequency Identification) positioning system, and more particularly, to a system and method for positioning an active RFID tag.

2. Related Art

RFID (Radio Frequency Identification) system has two basic elements: RFID tag and RFID reader. RFID tag may have an IC (Integrated Circuit) to process and modulate (Radio Frequency) RF signals. RFID tag may be classified into active and passive tags according to if an independent power source is embedded therein. An active RFID tag has an independent power source to provide necessary electricity to the IC, while a passive RFID tag generates sensing current through magnetic induction to conduct the operation of the IC. When the RFID reader receives the RF signal from the active RFID tag, the RFID reader may estimate the distance between the active RFID tag and the RFID reader according to the changes of signal intensity (Radio Signal Strength Indicator, RSSI) of the RF signal. Based on such characteristic, the active RFID tag is generally used for the positioning purpose.

Triangulation is commonly used to position a signal source. In the so-called triangulation, as shown in FIG. 1A, at least three RFID readers 101~103 are used to trace the signal intensity of the same signal source 104a. The possible distances 105~107 between the signal source 104a and each of the RFID readers 101~103 are calculated first. Then use the RFID readers 101~103 that are able to receive RF signals from the signal source 104a as a circle center, so as to calculate the overlapped area 108 of the possible ranges of signal source 104a and the RFID readers 101~103. The obtained overlapped area 108 indicates the possible location of the signal source 104a. The triangulation basically uses single-time positioning approach to position the location of the signal source.

The triangulation in the prior art is also applied to position the location of the active RFID tag. However, in the circumstance of interior positioning, the signal intensity is easily changed. If the signal intensity received directly is used to estimate the possible location and obtain the overlapped area 108, a greater distance difference may thereby be generated. As shown in FIG. 1B, assume there is a barrier 109 disposed between the signal source 104b and the RFID reader 101. The signal intensity received by the RFID reader 101 is possibly much weaker, which causes misjudgments of the distance 105 between the signal source 104b and the RFID reader 101 to be longer than the actual distance 110. If such conditions happens on other RFID readers (such as 102 and 103) at the same time, the possible area 108 obtained from the single-time positioning of the received signal intensities of each of the RFID readers 101~103 may possibly deviates from the actual location of the signal source 104b.

Therefore, in the prior art the interior single-time positioning from the RF signals received by the RFID reader is not precise due to the interior signal intensity of the RFID reader has unstable changes.

SUMMARY OF THE INVENTION

Accordingly, the present invention provides a system and method for positioning a target object with an active RFID tag equipped thereon. The present invention solves the technical problems in the prior art by through multi-positioning and continuous adjustment of the positioned location.

In an embodiment of the present invention, a positioning system is adapted to position a target object equipped with an active RFID (Radio Frequency Identification) tag by more than one RFID readers. The system comprises a receiving module, a comparison module, a setting module and an output module. The receiving module receives a RF (Radio Frequency) signal of the active RFID tag received from each of the RFID readers respectively; a corresponding signal intensity of each of the RF signals is calculated. The comparison module compares the corresponding signal intensities of the RF signals to calculate an approaching vector corresponding to the location of the RFID reader with the greatest signal intensity of the RF signal. The setting module defines a geometric center of the locations of the RFID readers as a first coordinate which is also defined as a positioned location of the target object. The setting module also approaches the positioned location from the first coordinate to a second coordinate according to the approaching vector when the location of the RFID reader with the greatest signal intensity is determined, and then resets the first coordinate and the positioned location of the target object as the second coordinate after finish approaching. The output module outputs the location of the first coordinate reset by the setting module as the positioned location of the target object. The comparison module, the setting module and the output module continuously operates to output the updated positioned location of the target object when the receiving module continuously receives the RF signals.

In another embodiment of the present invention, a positioning method is adapted to use multiple RFID readers to position a target object with an active RFID tag equipped thereon. The method defines a geometric center of the locations of the RFID readers as a first coordinate for a positioned location of the object. The method repeats the following steps when the RFID readers continuously receive RF signals of the active RFID tag: receiving the RF signals of the active RFID tag through the RFID readers, and a corresponding signal intensity of each of the RF signals being calculate; comparing corresponding signal intensity of each of the RF signals; calculating an approaching vector corresponding to the location of the RFID reader with the greatest signal intensity of the RF signal; approaching the positioned location of the target object from the first coordinate to a second coordinate according to the approaching vector; resetting the first coordinate and the positioned location of the target object as the second coordinate; and outputting the reset first coordinate as the latest positioned location of the target object.

These and other features, aspects, and advantages of the present invention will become better understood with reference to the following description and appended claims. It is to be understood that both the foregoing general description and the following detailed description are examples, and are intended to provide further explanation of the invention as claimed.

BRIEF DESCRIPTION OF THE DRAWINGS

The present invention will become more fully understood from the detailed description given herein below for illustration only, and thus is not limitative of the present invention, and wherein:

FIG. 1A is an explanatory diagram illustrating that the conventional triangulation in the prior art is used to position a signal source within a non-barrier environment;

FIG. 2C is an explanatory diagram of another preferred embodiment of the present invention, illustrating that the setting module approaches to another positioned location;

DETAILED DESCRIPTION OF THE INVENTION

Figure 1B:
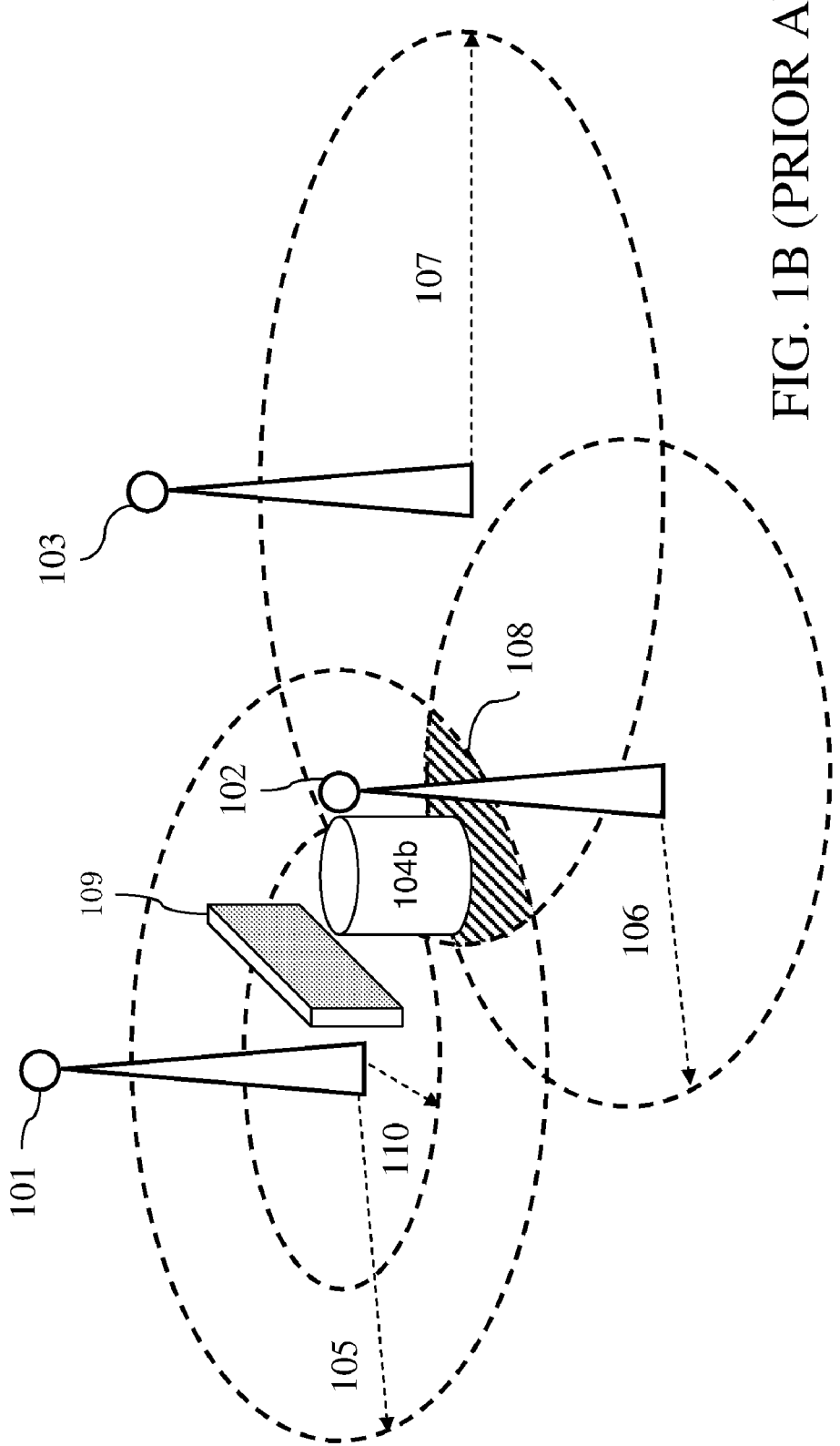
FIG. 1B is an explanatory diagram illustrating that the conventional triangulation in the prior art is used to position a signal source within an environment with a barrier.

Reference will now be made in detail to the present preferred embodiments of the invention, examples of which are illustrated in the accompanying drawings. Wherever possible, the same reference numbers are used in the drawings and the description refers to the same or the like parts.

The present invention is adapted to use multiple RFID (Radio Frequency Identification) readers to position a target object equipped with an active RFID tag. The amount of the RFID readers available for said positioning operation may depend on the screening of the signal intensity, or the previously arranged amount of the RFID readers; the present invention has no limitation therewith.

Furthermore, the RFID readers disclosed in the present invention are employed to receive the RF (Radio Frequency) signal sent from the active RFID tag; wherein the received RF signals will be integrated and processed for the determination of positioning operation. The following descriptions explain several preferred embodiments of the present invention.

Figure 2A:
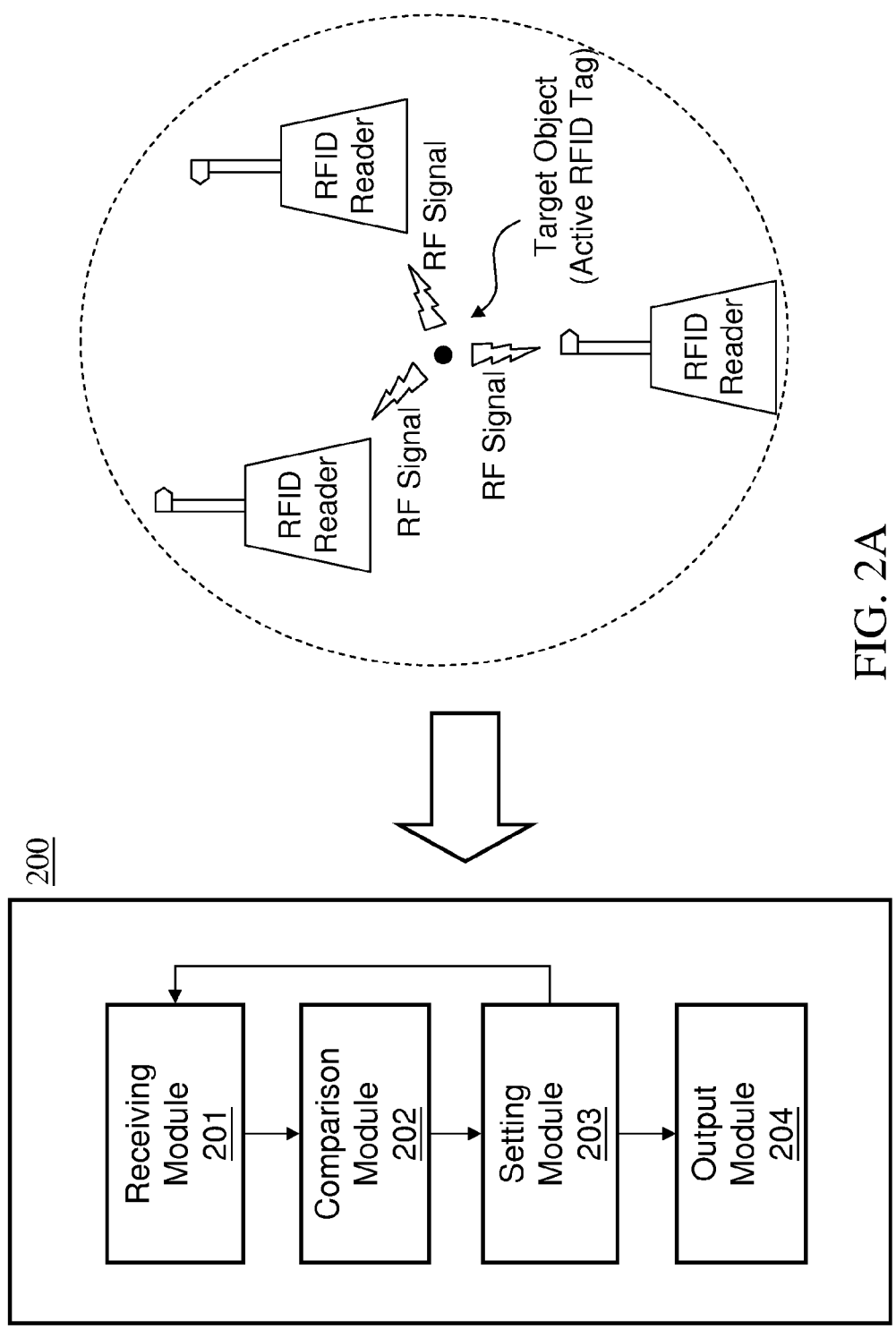
FIG. 2A is a system diagram of the positioning system for positioning the active RFID tag according to a preferred embodiment of the present invention.

Please refer to FIG. 2A, which is a system diagram of the positioning system for positioning the active RFID tag according to a preferred embodiment of the present invention. As shown in the drawing, the positioning system 200 includes a receiving module 201, a comparison module 202, a setting module 203 and an output module 204.

The receiving module 201 simultaneously receives the RF signals transmitted from the RFID readers. In actual implementation the receiving module 201 may have the capability to calculate the corresponding signal intensity of each of the RF signals sent from the active RFID tag of the target object. The RFID readers with different specifications of hardware/software have some differences in support capability, so the intensity range of the received RF signals has differences as well; generally the intensity range is between −20 dbm and −100 dbm.

The comparison module 202 compares the signal intensities of all the RF signals after the receiving module 201 receives the RF signals received by the RFID readers. In actual implementation, the positioning system 200 and the RFID readers may be implemented with network modules such as Ethernet modules so as to connect with each other through network cables. Namely the information of the RF signals may be transferred from the RFID readers through connected network.

As a side note, the signal intensity may be calculated by the receiving module 201, and then through the comparison module 202, the signal intensities of the RFID readers are compared with each other to determine the intensity ranking.

Another approach for calculating the signal intensity is to use the receiving module 201 as an interface of receiving the RF signals from the RFID reader. All the calculation and comparison operations of the signal intensities may be performed by the comparison module 202.

When the comparison module 202 finishes the comparison of all the signal intensities of the RF signals, the RFID reader with the greatest signal intensity will be determined, and thereby calculating an approaching vector corresponding to the location of the RFID reader with the greatest signal intensity of the RF signal. The approaching vector will be used as the basis of approaching the positioned location of the target object.

The setting module 203 defines, when the positioning system 200 is initialized, a geometric center of the locations of the RFID readers as a first coordinate for the current positioned location of the target object. For example, when there are two RFID readers used in the positioning operation, the location of the first coordinate is the midpoint between the two RFID readers. When there are three RFID readers used in the positioning operation, the user may set the positioning system by demand to obtain the circumcenter, gravity center, inner center, orthocenter or any other "center" based on geometry of all the RFID readers as the first coordinate. When the comparison module 202 determines the RFID reader with the greatest signal intensity, the setting module 203 will approach the positioned location of the target object from the first coordinate to a second coordinate according to the approaching vector. These coordinates are equivalent to approaching points to approach the actual position of the target object. After the approaching operation above, the setting module 203 resets the location of the current second coordinate as the next first coordinate, and then repeats the foregoing steps until reaching a termination condition.

The termination condition may be whether the accumulated time used in the positioning operation has reached a default positioning duration threshold, or whether the times that the location of the current second coordinate reset to the next first coordinate has reaches a default positioning times threshold. For example, the positioning system 200 may set that the last first coordinate reset by the setting module 203 in 60 seconds as the positioned location of the target object. Or, the system may set 10 times reset operation and use the last first coordinate as the positioned location of the target object. Another termination condition is at the moment that the ranking of the signal intensities of the RF signals received by the RFID readers remain the same for a reset times threshold, the operation of repeatedly comparing the signal intensity and location approaching may be terminated and the system then enters the output operation to output the latest reset first coordinate as the positioned location of the target object. For example, assume some RFID reader remains as the RFID reader with the greatest intensity for i.e. 10 times, that means the signal intensities have been relatively stable. Thus, the positioning system 200 need not to repeatedly perform the same operation and will then directly output the latest positioned location to reduce unnecessary waste of system resources.

The output module 204 outputs the latest location of the first coordinate reset by the setting module 203 as the positioned location of the target object. When the receiving module 201 continuously received the RF signals received by the RFID readers, the comparison module 202, the setting module 203 and the output module 204 will continuously operate and will stop operating when reaching the termination condition. Then the setting module 203 resets the location of the latest second coordinate as the latest first coordinate, which indicates the latest positioned location that will be output by the output module 204.

Figure 2B:
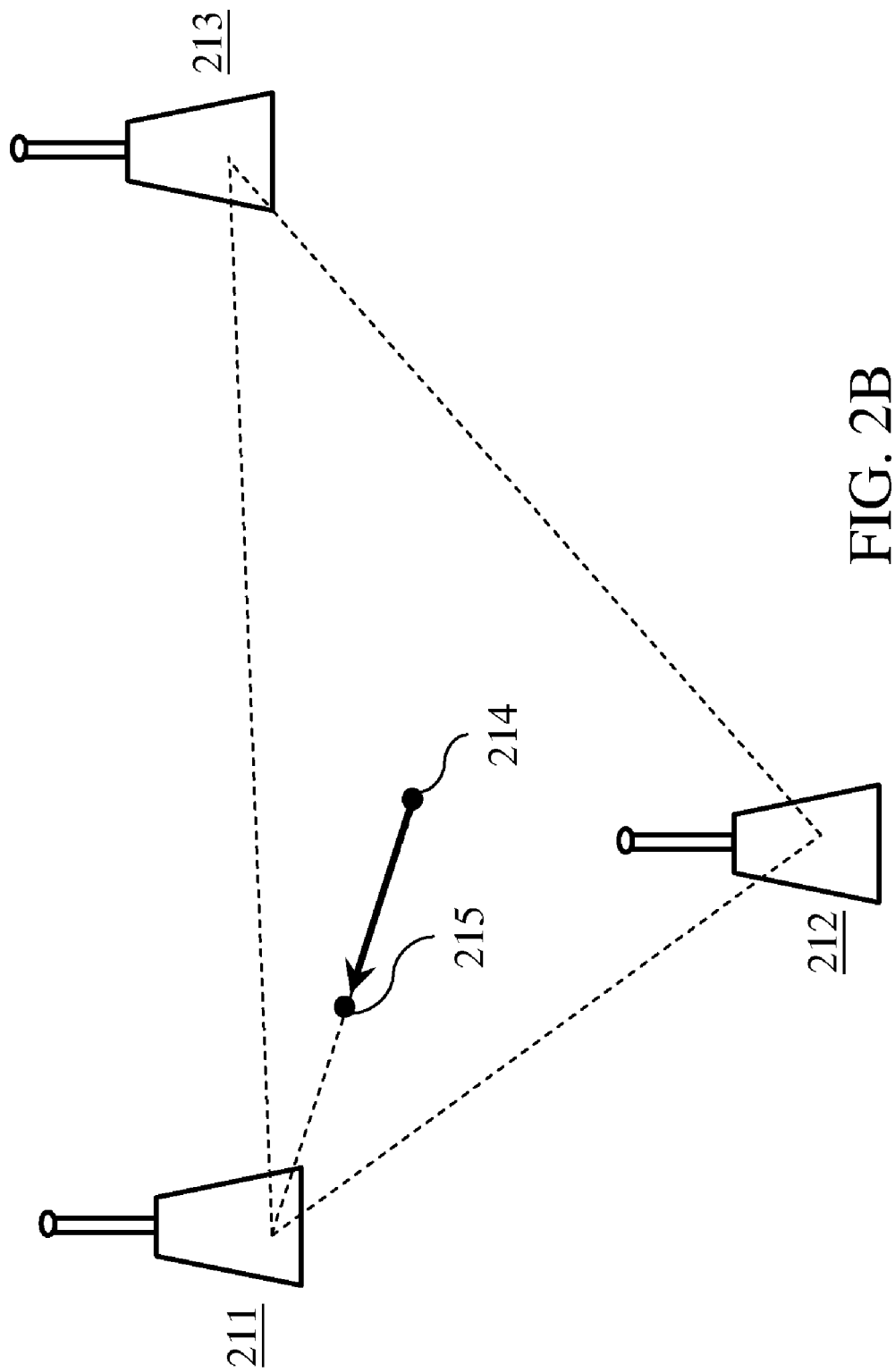
FIG. 2B is an explanatory diagram of the preferred embodiment of the present invention, illustrating that the setting module approaches to a positioned location.

Moreover, as a further explanation, the setting module 203 may approach the first coordinate to the second coordinate through different approaching ways. On method is to use the midpoint between the current first coordinate and the RFID reader with the greatest signal intensity as the location of the second coordinate. As shown in FIG. 2B, assume there are three RFID readers, the first RFID reader 211, the second RFID reader 212 and the third RFID reader 213, and assume the geometric center is the intersection point of the three median lines between each two of the first RFID reader 211, the second RFID reader 212 and the third RFID reader 213, the first coordinate 214 will be defined as the intersection point of the three median lines within the triangle area between the three RFID readers. Assuming that in some comparison the comparison module 202 determines the RF signal received by the first RFID reader 211 has the greatest signal intensity, the setting module 203 will then define the midpoint 215 between the location of the first coordinate 214 and the first RFID reader 211 as the location of the second coordinate. The mentioned approaching vector can then be defined as the vector from the location of the first coordinate 214 to the midpoint 215 and pointing to the first RFID reader 211.

Another way to set/define the location of the second coordinate is by measuring a unit length from the location of the current first coordinate towards the RFID reader with the greatest signal intensity. Please refer to FIG. 2C, assuming in some comparison the comparison module 202 determines the RF signal received from the first RFID reader 211 has the greatest signal intensity, the setting module 203 will then define/set the location of the second coordinate as a position 217, which is located away from the first coordinate 214 but closer to the first RFID reader 211 with a fixed unit length 216. For example, if the fixed unit length 216 is 0.1 meter, every time the setting module 203 will set the second coordinate as the point at which the first coordinate will be approached 0.1 meter towards the direction of the first RFID reader 211 with the greatest signal intensity. In this case the approaching vector is set from the first coordinate 214 to the position 217 pointing to the first RFID reader 211.

Although the foregoing two approaching examples of the setting module 203 have differences, in actual implementation those are only minor differences of the approaching range, which are only minor modifications for those skilled in the art under the same inventive concept of the present invention.

Figure 2D:
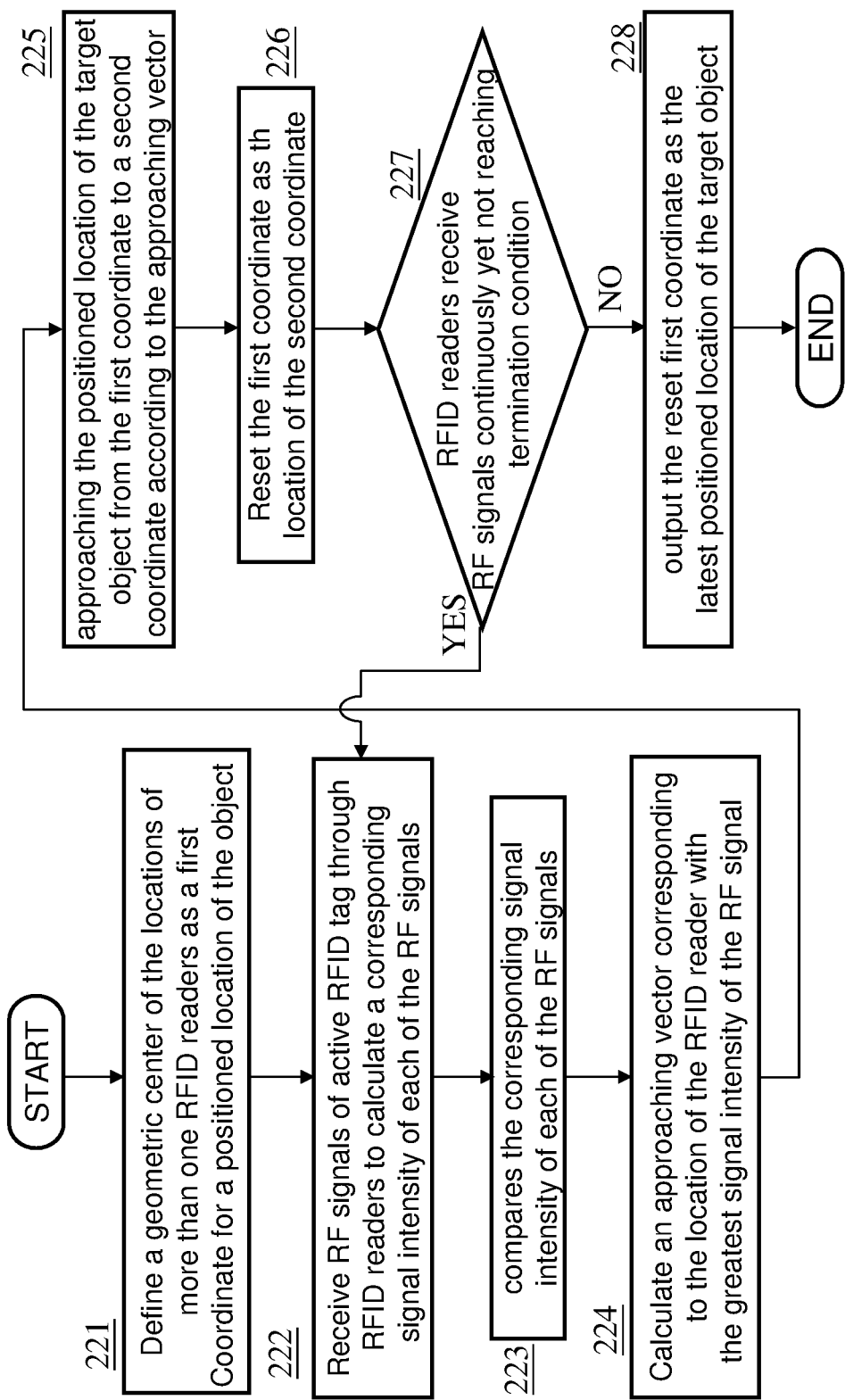
FIG. 2D is a flow chart of the positioning method for positioning the active RFID tag according to the preferred embodiment of the present invention.

Please refer to FIG. 2D, which is a flow chart of the positioning method for positioning the active RFID tag according to the preferred embodiment of the present invention. The positioning method disclosed in the first embodiment is adapted to use a plurality of RFID (Radio Frequency Identification) readers to position a target object with an active RFID tag equipped thereon. First of all, the setting module 203 sets/defines a geometric center of the locations of more than one RFID readers as a first coordinate for a positioned location of the object (Step 221). For example, if there are two RFID readers used in the positioning operation, the first coordinate may be defined as the midpoint of the 2 RFID readers; when there are three RFID readers used in the positioning operation, the first coordinate may be defined as the circumcenter, gravity center, inner center, orthocenter or any other "center" based on geometry of all the RFID readers according to different requirements assigned for positioning operation. The present invention has no limitation here and for those skilled in the art, the determination of the first coordinate may be modified without departing from the inventive concept of the present invention.

Next, the receiving module receives the RF signals of the active RFID tag through the RFID readers to calculate a corresponding signal intensity of each of the RF signals (Step 222); and then the comparison module compares the corresponding signal intensity of each of the RF signals (Step 223). The RFID readers with different specifications of hardware/software have some differences in support capability, so the intensity range of the received RF signals has differences as well; generally the intensity range is between −20 dbm and −100 dbm. Afterwards, the comparison module determines the RFID reader with the greatest signal intensity of the RF signal, and calculates signal intensity an approaching vector corresponding to the location of the RFID reader with the greatest signal intensity of the RF signal (Step 224). The setting module next approaches the positioned location of the target object from the first coordinate to a second coordinate according to the approaching vector (Step 225). Then, the comparison module is updated so that the second coordinate becomes the new first coordinate (Step 226). When the RFID readers continuously receive the RF signals yet not reaching the termination condition (Step 227), repeat the foregoing steps of receiving RF signals, comparing and approaching (Step 222~226); when the termination condition is reached, these steps may stop proceeding and the output module outputs the location of the first coordinate reset by the setting module as the positioned location of the target object (Step 228). The termination condition here has been defined in the above embodiment.

Figure 3A:
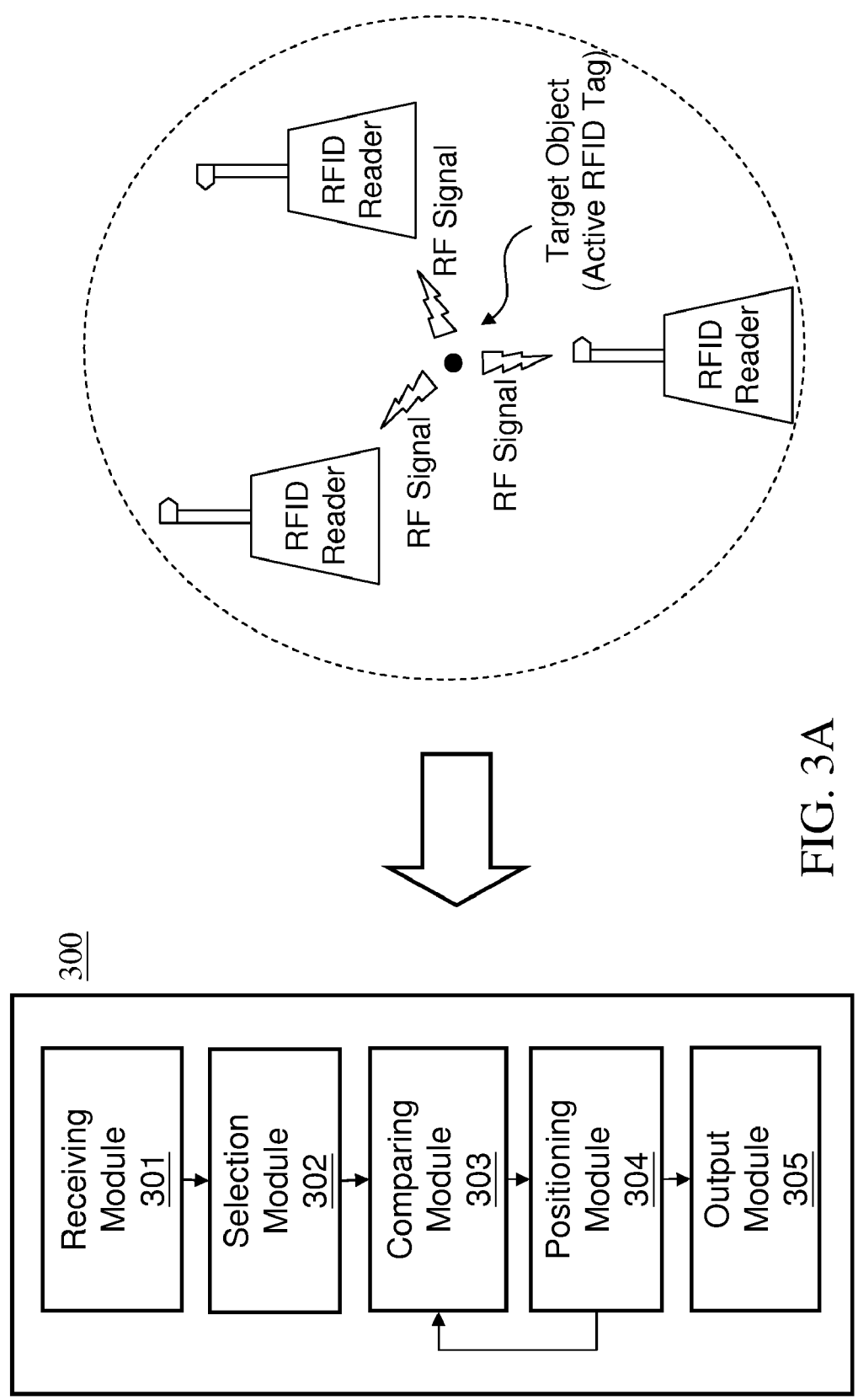
FIG. 3A is a system diagram of the positioning system for positioning the active RFID tag according to another preferred embodiment of the present invention.

Please refer to FIG. 3A, which is a system diagram of the positioning system for positioning the active RFID tag according to another preferred embodiment of the present invention. The second embodiment of the present invention discloses a positioning system adapted to use more than one RFID reader to position the target object with an active RFID tag equipped therein. The positioning system 300 includes a receiving module 301, a selection module 302, a comparison module 303, a positioning module 304 and an output module 305.

The receiving module 301, receives the RF signals transmitted from the RFID readers. Similarly, the RFID readers with different specifications of hardware/software have some differences in support capability, so the intensity range of the received RF signals has differences as well; generally the intensity range is between −20 dbm and −100 dbm.

The selection module 302 selects RFID reader two-by-two of the RFID readers into multiple comparison pairs. For example, when there are three RFID readers used in the positioning operation, three comparison pairs will be matched. Then, the selection module 302 will select one of the comparison pairs every time and provide it to the comparison module 303 for comparing operation.

The comparison module 303 compares the RF signals of the RFID readers within the comparison pairs selected by the selection module 302, and determines the RFID reader with the greater signal intensity.

The signal intensity mentioned in the present embodiment, has the similar two calculation ways as the ones in the first embodiment. One is that the RFID reader calculates the signal intensity and transmits to the positioning system 30; the other is that the RFID reader determines only if it receives the RF signal, and the comparison module 303 of the positioning system 300 will be performing the calculation of the signal intensity. Both ways are similar to those described above.

Figure 3B:
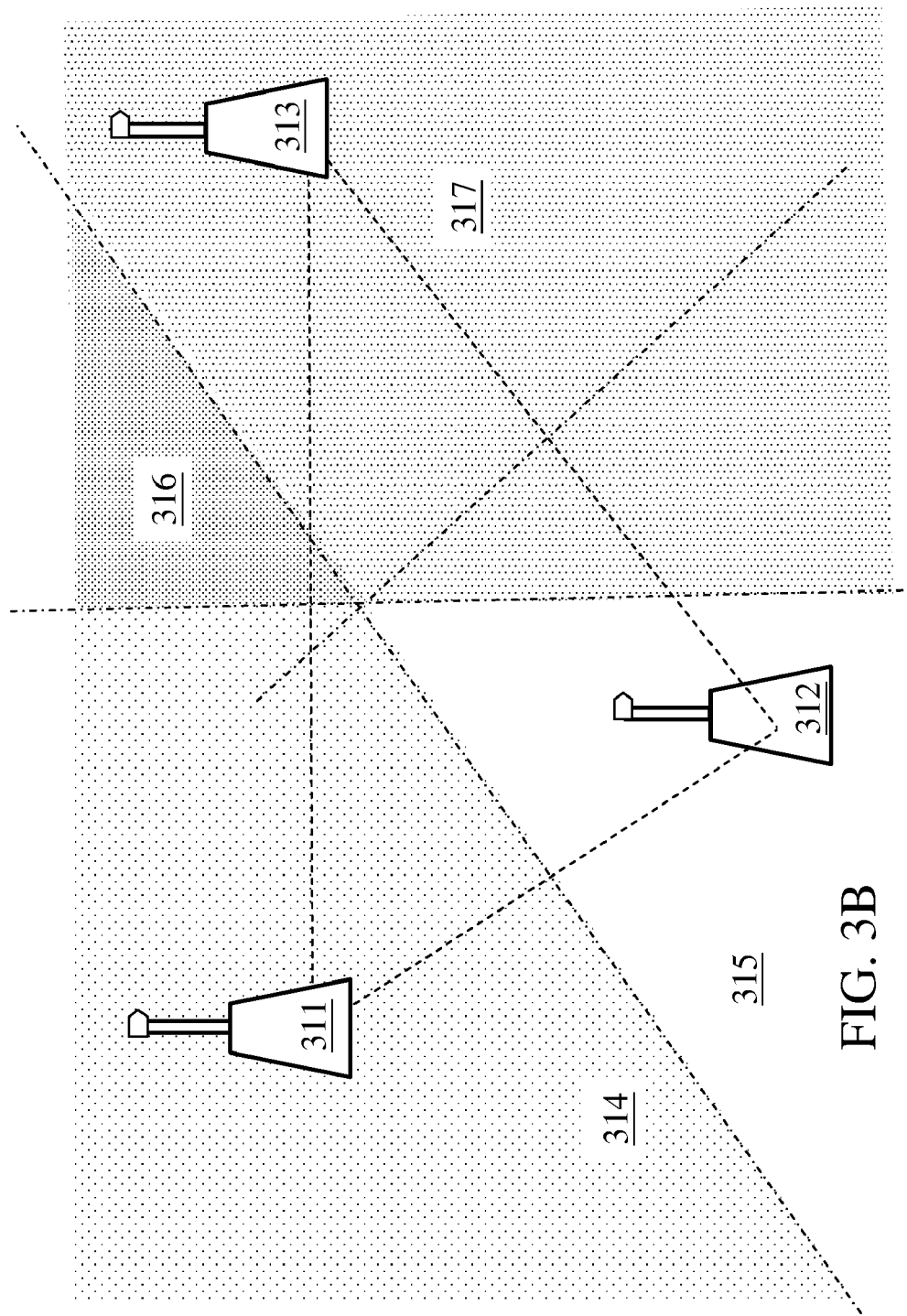
FIG. 3B is an explanatory diagram showing the overlapping of the effective ranges according to another preferred embodiment of the present invention.

The positioning module 304 positions an effective range of each of the RFID reader with the greater signal intensity within each of the comparison pairs. The effective range here means a half area that is divided by a middle line of the two RFID readers within the comparison pair, and corresponding to the RFID reader with the greater signal intensity within the same comparison pair. For example, as shown in FIG. 3B, assume there are three RFID readers, the first RFID reader 311, the second RFID reader 312 and the third RFID reader 313. If the comparison pair selected by the selection module 302 includes the first RFID reader 311 and the second RFID reader 312, when the comparison module compares and determines the signal intensity received by the first RFID reader 311 is greater than the second RFID reader 312, within the two half areas 314 and 315 divide by the middle line of the first RFID reader 311 and the second RFID reader 312, the positioning module 304 will set the half area 314 between the middle line and the first RFID reader 311 as the effective range. The effective range 317 may also be determined by the similar process. Similarly, the selection module 302 will select the next comparison pair, and multiple effective ranges may be obtained through the comparison and determination operations of the comparison module 303. An overlapped range 316 in FIG. 3B will be determined from the effective ranges 314 and 317 by the positioning module 304.

The output module 305 outputs the overlapped range positioned by the positioning module 304 as the positioned location of the target object. When the selection module 302 reselects the next comparison pair and the comparison module 303 finishes the comparison operations one by one, the overlapped range 316 will be determined by the positioning module 304 and output by the output module 305.

Figure 3C:
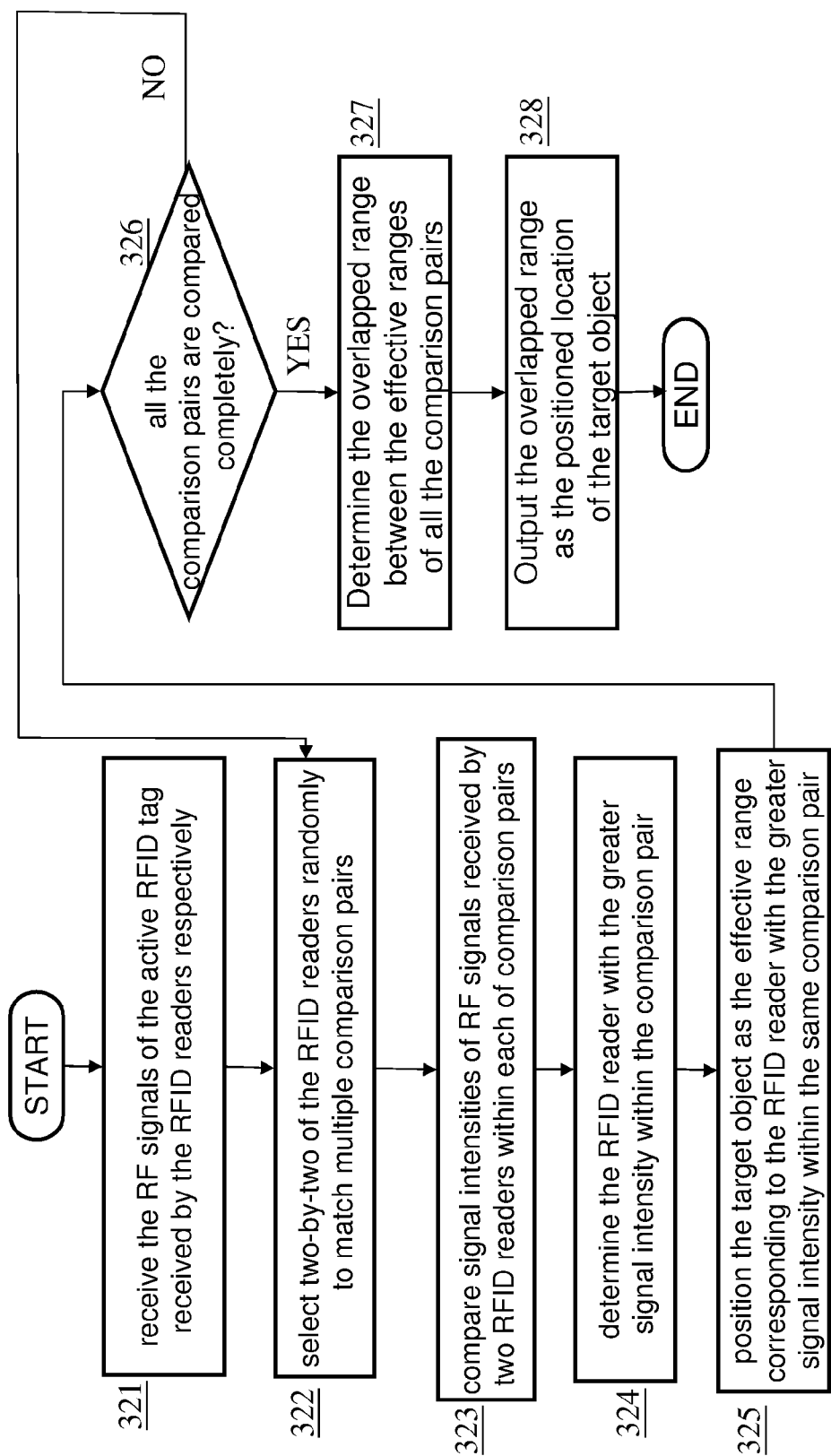
FIG. 3C is a flow chart of the positioning method for positioning the active RFID tag according to another preferred embodiment of the present invention.

Please refer to FIG. 3C, which is a flow chart of the positioning method for positioning the active RFID tag according to another preferred embodiment of the present invention.

First of all, the receiving module 301 receives the RF signals of the active RFID tag received by the RFID readers respectively (Step 321). Next, the selection module 302 selects two-by-two of the RFID readers randomly to match a plurality of comparison pairs (Step 322). If the two-by-two comparison pairs are not finished with the comparison operation, the comparison module 303 compares the signal intensities of the RF signals received by the two RFID readers within each of the comparison pairs (Step 323). Afterwards, the comparison module 303 will determine the RFID reader with the greater signal intensity within the comparison pair (Step 324). The positioning module 304 will position the positioned location of the target object as the effective range corresponding to the RFID reader with the greater signal intensity within the same comparison pair (Step 325). After one effective range finishes the comparison operation, the selection module 302 will determine whether all the comparison pairs are compared completely (Step 326). The effective range here means the half area that is divided by the middle line of the two RFID readers within the comparison pair, and corresponding to the RFID reader with the greater signal intensity within the same comparison pair. If not, repeatedly perform positioning the effective range(s) of the rest of the comparison pair(s) (Step 322~326); if yes, the positioning module 304 will determine the overlapped range between the effective ranges of all the comparison pairs (Step 327). Next, the output module 305 outputs the overlapped range as the positioned location of the target object (Step 328). Different from the first embodiment, the positioned location obtained in the present second embodiment is a positioned area instead of a single point; through multiple times of positioning operations or determination of the positioned areas, the accuracy of positioning operation may be effectively increased.

As a brief for the foregoing, the major difference between the present invention and the prior art is the technical means that the present invention uses multiple RFID readers to receive the RF signals, and multiple times of RFID selection, location modification or approaching operations are performed according to the signal intensity of the RF signals. Therefore, the present invention may solve the technical problems that the single time positioning operation based on the signal intensity has poor positioning accuracy, and further conducts a precise positioning operation to the active RFID tag equipped on the target object and thereby increasing the positioning accuracy.

Additional advantages and modifications will readily occur to those proficient in the relevant fields. The invention in its broader aspects is therefore not limited to the specific details and representative embodiments shown and described herein. Accordingly, various modifications may be made without departing from the spirit or scope of the general inventive concept as defined by the appended claims and their equivalents.

What is claimed is:

1. A system adapted to determine the position of a stationary target object equipped with an active RFID (Radio Frequency Identification) tag by using a plurality of RFID readers, wherein the system uses iteration to determine the position with greater accuracy than triangulation, the system comprising:

a receiving module receiving a RF (Radio Frequency) signal of the active RFID tag received from each of the RFID readers respectively, and calculating a corresponding signal intensity of each of the RF signals;

a setting module defining the first estimated location of the target object as a middle point between the RFID readers and then moving the estimated location according to an estimated location vector when the location of the RFID reader with the greatest signal intensity is determined;

a comparison module comparing the corresponding signal intensities of the RF signals to calculate the estimated location vector corresponding to the location of the RFID reader with the greatest signal intensity of the RF signal, wherein the estimated location vector is collinear with the line that connects the estimated location and the RFID reader with the greatest signal intensity of the RF signal; and an output module outputting the estimated location of the target object;

wherein the setting module, the comparison module and the output module operate to output the latest estimated location of the target object as long as the receiving module receives the RF signals.

2. The system as claimed in claim 1, wherein the RFID reader further calculates the signal intensity of each of the received RF signals.

3. The system as claimed in claim 1, wherein the comparison module further calculates the signal intensity of each of the received RF signals.

4. The system as claimed in claim 1 further comprising a positioning duration threshold, wherein the system is operative when the accumulated time for the positioning operations reaches the positioning duration threshold, the estimated location last output by the output module will be used as the location of the target object.

5. The system as claimed in claim 1 further comprising a positioning times threshold, wherein when the positioning times threshold is reached, the estimated location last output by the output module will be used as the location of the target object.

6. The system as claimed in claim 1 further comprising a reset times threshold, wherein when comparing through the comparison module, if the ranking of the signal intensities of the RF signals received by the RFID readers remains the same for the reset times threshold, then the estimated location last output by the output module will be used as the location of the target object.

7. The system as claimed in claim 1, wherein the setting module sets estimated location (n plus one) as a midpoint between estimated location (n) and the RFID reader with the greatest signal intensity.

8. The system as claimed in claim 1, wherein the setting module sets the estimated location (n plus one) by approaching a unit length from estimated location (n) towards the RFID reader with the greatest signal intensity.

9. A method adapted to use a plurality of RFID (Radio Frequency Identification) readers to determine the position of a stationary target object equipped with an active RFID (Radio Frequency Identification) tag, wherein the system uses iteration to determine the position with greater accuracy than triangulation, the method comprising the steps of:
  defining the first estimated location of the target object as a middle point between the RFID readers;
  repeating the following steps as long as the RFID readers continuously receive RF (Radio Frequency) signals of the active RFID tag:
  receiving the RF signals of the active RFID tag through the RFID readers to calculate a corresponding signal intensity of each of the RF signals;
  comparing corresponding signal intensity of each of the RF signals;
  calculating an estimated location vector corresponding to the location of the RFID reader with the greatest signal intensity of the RF signal, wherein the estimated location vector is collinear with the line that connects the estimated location and the RFID reader with the greatest signal intensity of the RF signal;
  moving the estimated location according to the estimated location vector;
  outputting the latest estimated location of the target object.

10. The method as claimed in claim 9, wherein the RFID reader further calculates the signal intensity of each of the received RF signals.

11. The method as claimed in claim 9 further comprising the step of calculating the signal intensity of each of the received RF signals.

12. The method as claimed in claim 9, wherein the repeated steps are terminated by a default positioning duration threshold.

13. The method as claimed in claim 9, wherein the repeated steps are terminated by a default positioning times threshold.

14. The method as claimed in claim 9 further comprising the steps of:
  terminating the repeated steps if the ranking of the signal intensities of the RF signals received by the RFID readers remains the same for a reset times threshold; and
  outputting the latest estimated location as the location of the target object.

15. The method as claimed in claim 9, wherein estimated location (n plus one) is defined as a midpoint between estimated location (n) and the RFID reader with the greatest signal intensity of the RF signal.

16. The method as claimed in claim 9, wherein estimated location (n plus one) is determined by approaching a unit length from the location of estimated location (n) towards the RFID reader with the greatest signal intensity.

17. A system to use a plurality of RFID (Radio Frequency Identification) readers to position a target object with an active RFID tag equipped thereon, the positioning system comprising:
  a receiving module receiving a RF (Radio Frequency) signal of the active RFID tag received from each of the RFID readers respectively;
  a selection module selecting pairs of the RFID readers at random until all possible combinations have been selected thus providing a plurality of comparison pairs;
  a comparison module comparing the RF signals of the RFID readers within the comparison pairs, and determining the RFID reader with the greater signal intensity within each of the comparison pairs;
  a positioning module positioning an effective range of each of the RFID reader with the greater signal intensity within each of the comparison pairs to calculate an overlapped range of the effective ranges; and
  an output module outputting the overlapped range as the estimated location of the target object, wherein, for each comparison pair, a first line connects the two RFID readers in the comparison pair and a second line bisects the first line to define two half areas wherein the effective range of a comparison pair is the half area that contains the RFID reader with the greater signal intensity within the comparison pair.

18. The system as claimed in claim 17, wherein the RFID reader further calculates the signal intensity of each of the received RF signals.

19. The system as claimed in claim 17, wherein the comparison module further calculates the signal intensity of each of the received RF signals.

20. The system as claimed in claim 17, wherein the effective range indicates a half area that is divided by a middle line of the two RFID readers within the comparison pair and corresponding to the RFID reader with the greater signal intensity within the same comparison pair.

* * * * *